United States Patent
Cortinovis et al.

(10) Patent No.: US 9,711,299 B2
(45) Date of Patent: Jul. 18, 2017

(54) CONTACT-FINGER-ELEMENT AND TULIP-CONTACT-ASSEMBLY FOR SWITCHING DEVICE

(71) Applicant: ABB TECHNOLOGY AG, Zurich (CH)

(72) Inventors: Gianluca Cortinovis, Albino (IT); Ravindra Borse, Dalmine (IT)

(73) Assignee: ABB Schweiz AG, Baden (CH)

( * ) Notice: Subject to any disclaimer, the term of this patent is extended or adjusted under 35 U.S.C. 154(b) by 46 days.

(21) Appl. No.: 14/441,052

(22) PCT Filed: Nov. 7, 2012

(86) PCT No.: PCT/EP2012/072054
§ 371 (c)(1),
(2) Date: May 6, 2015

(87) PCT Pub. No.: WO2014/071972
PCT Pub. Date: May 15, 2014

(65) Prior Publication Data
US 2015/0294804 A1    Oct. 15, 2015

(51) Int. Cl.
*H01H 1/06*    (2006.01)
*H01H 1/38*    (2006.01)
(Continued)

(52) U.S. Cl.
CPC ............... *H01H 1/06* (2013.01); *H01H 1/38* (2013.01); *H01H 1/5866* (2013.01); *H01H 9/02* (2013.01);
(Continued)

(58) Field of Classification Search
CPC ... H01H 1/38; H01H 1/385; H01H 2033/6648
(Continued)

(56) References Cited

U.S. PATENT DOCUMENTS

| | | |
|---|---|---|
| 2010/0140225 A1 | 6/2010 | Seo |
| 2012/0129374 A1 | 5/2012 | Tu et al. |
| 2012/0228097 A1 | 9/2012 | Gemme et al. |

FOREIGN PATENT DOCUMENTS

| | | | | |
|---|---|---|---|---|
| JP | 2000-294063 A | 10/2000 | | |
| WO | WO2011017838 | * | 2/2011 | ............... H01H 1/38 |

OTHER PUBLICATIONS

International Search Report (PCT/ISA/210) mailed on Jul. 19, 2013, by the European Patent Office as the International Searching Authority for International Application No. PCT/EP2012/072054.
(Continued)

*Primary Examiner* — Edwin A. Leon
*Assistant Examiner* — Ahmed Saeed
(74) *Attorney, Agent, or Firm* — Taft Stettinius & Hollister LLP

(57) ABSTRACT

A contact-finger-element includes a first contact-portion and a second-contact-portion which are suitable for engaging with a first conducting terminal and with a second conducting-terminal respectively; the first-contact-portion and the second-contact-portion have respective cross-sections including concave "V"-shaped profiles, each concave "V"-shaped profile having two straight portions mutually tilted by a respective included angle which is adapted so as to enable the first contact-portion and the second-contact-portion to tangentially contact with a curved surface of the first conducting terminal and of the second conducting terminal respectively at intermediate zones of the respective straight portions. There is also disclosed a tulip-contact assembly comprising a plurality of such contact-finger-elements.

20 Claims, 5 Drawing Sheets

(51) Int. Cl.
*H01H 1/58* (2006.01)
*H01H 9/02* (2006.01)

(52) U.S. Cl.
CPC ... *H01H 2203/02* (2013.01); *H01H 2203/024* (2013.01); *H01H 2203/04* (2013.01)

(58) Field of Classification Search
USPC ........ 200/16 E, 16 R, 253.1, 260, 48 R, 245; 218/123, 128, 218, 140, 139; 439/251, 439/252
See application file for complete search history.

(56) References Cited

OTHER PUBLICATIONS

Written Opinion (PCT/ISA/237) mailed on Jul. 19, 2013, by the European Patent Office as the International Searching Authority for International Application No. PCT/EP2012/072054.

* cited by examiner

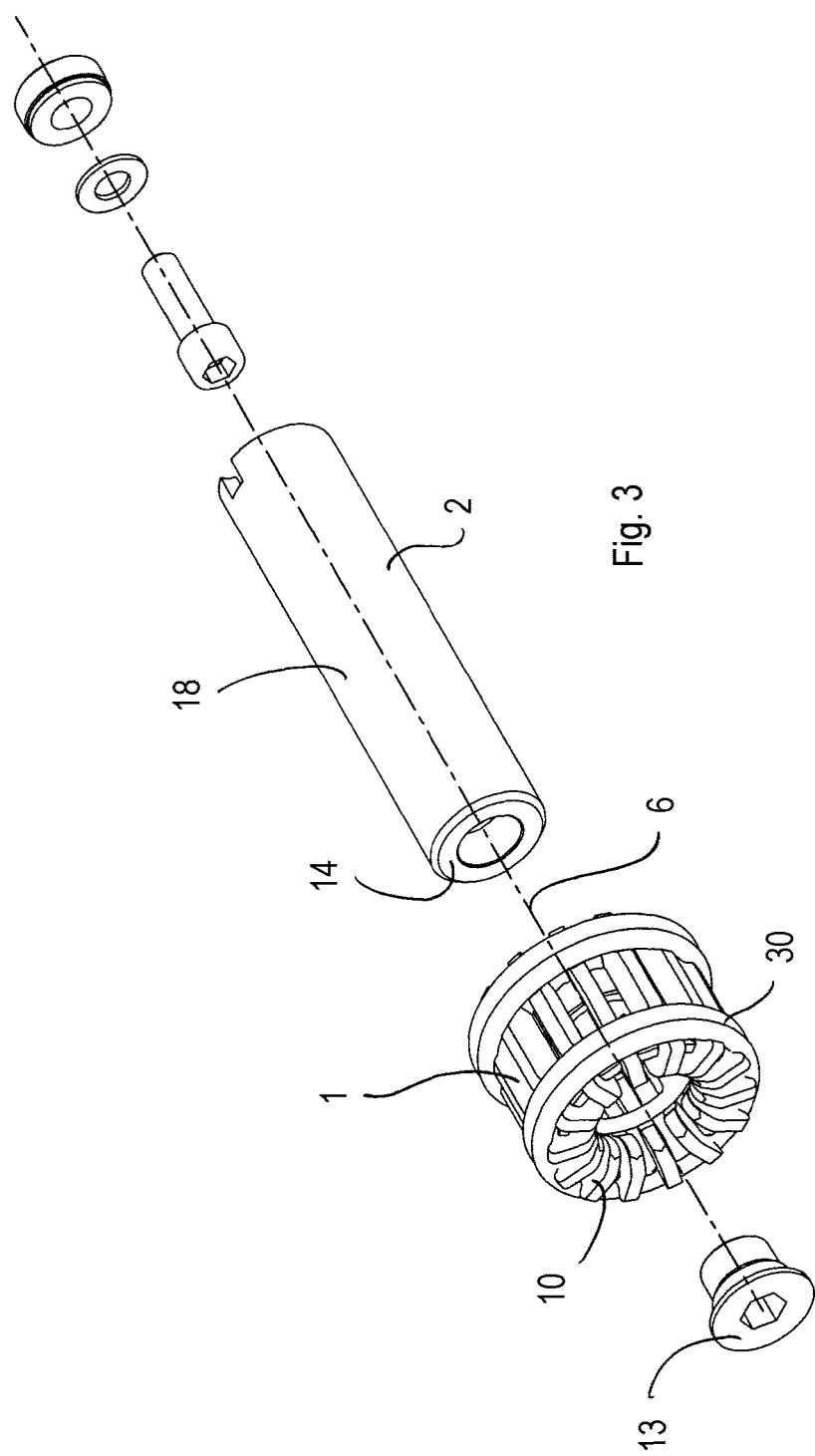

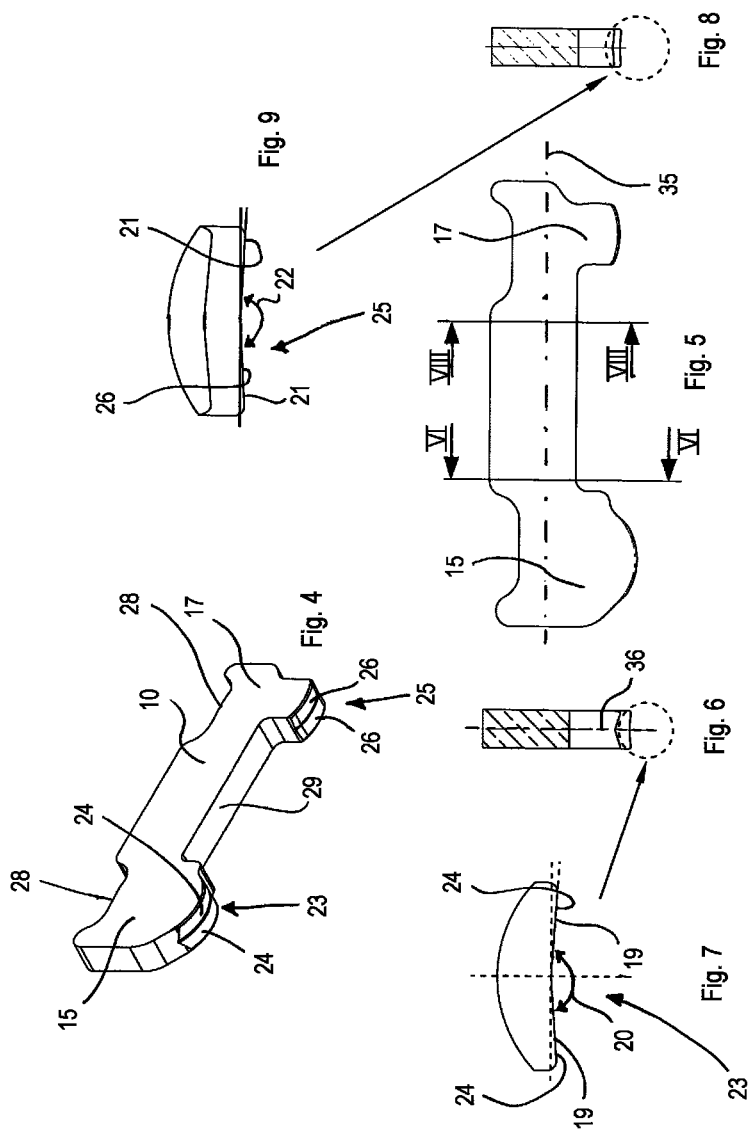

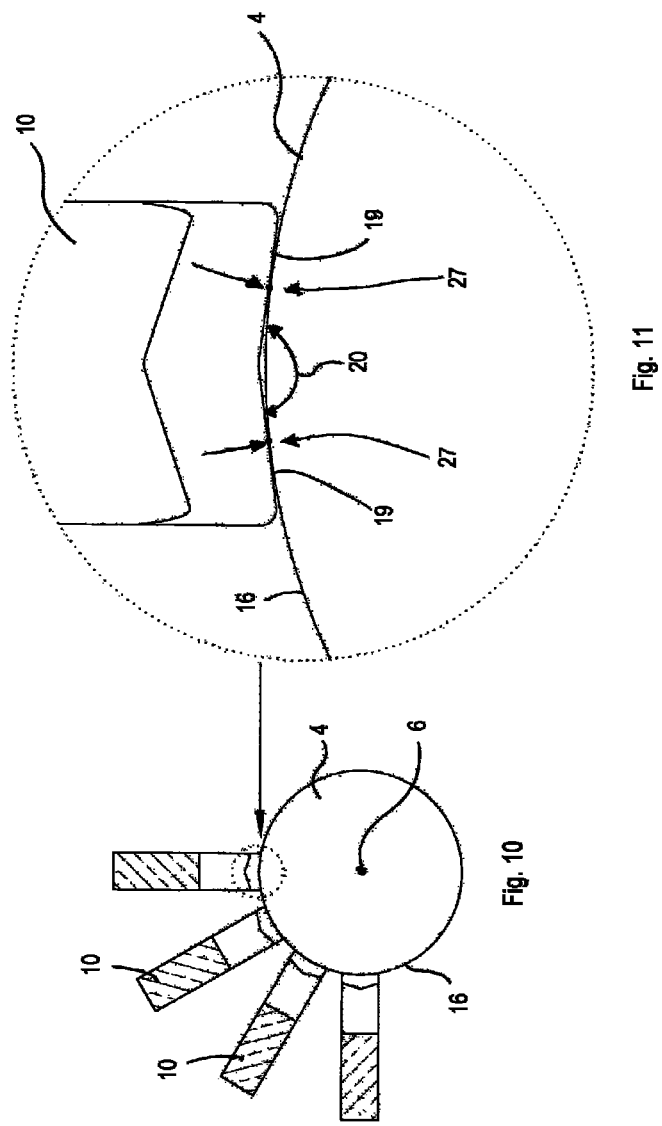

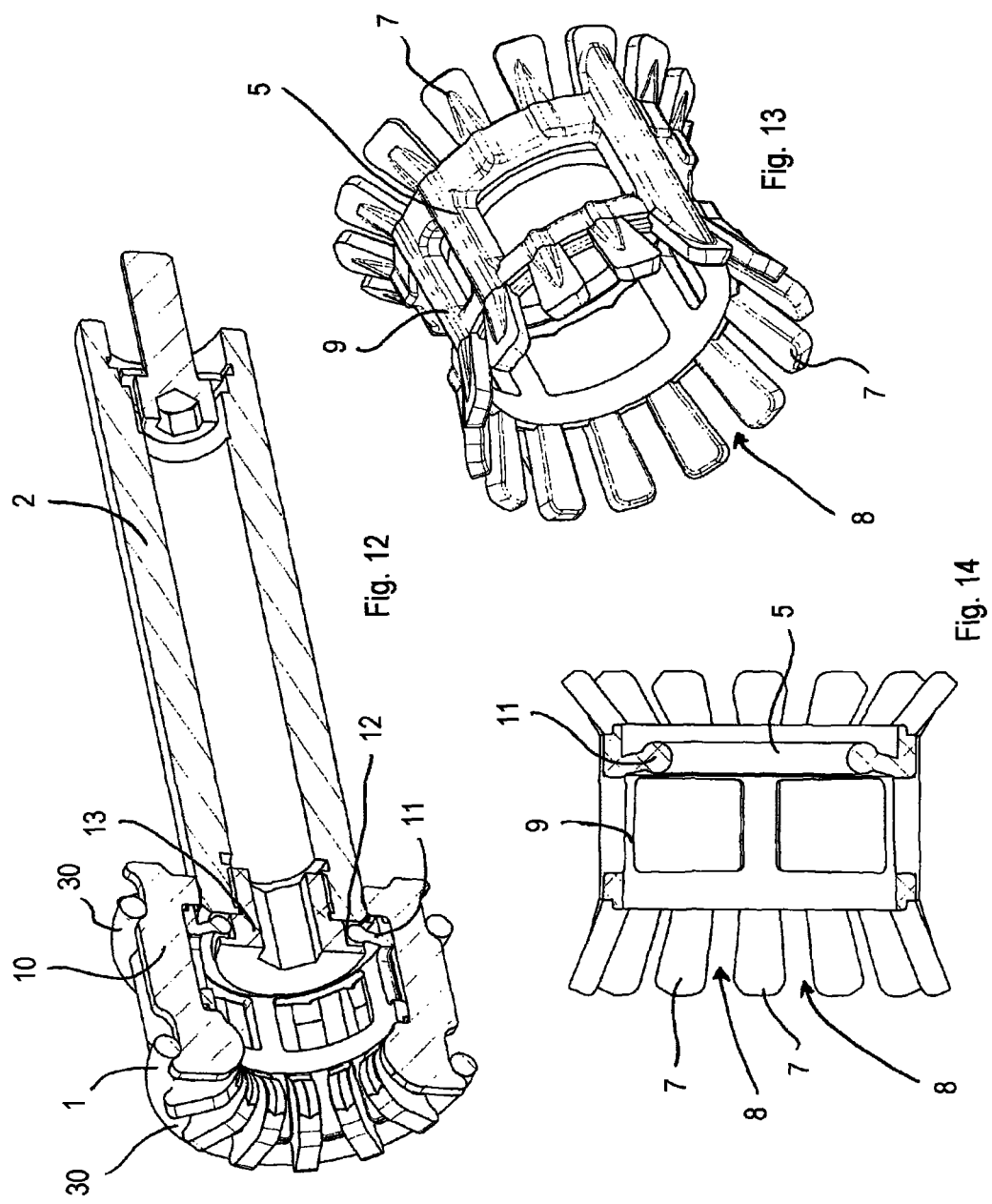

CONTACT-FINGER-ELEMENT AND TULIP-CONTACT-ASSEMBLY FOR SWITCHING DEVICE

This application is a national phase of PCT International Application No. PCT/EP2012/072054 filed Nov. 7, 2012. The entire content of this application is incorporated herein by reference.

The present disclosure relates to a contact-finger-element and a relative tulip-contact-assembly suitable for connecting a movable conducting terminal of a switching device, in particular of a circuit-breaker, to a stationary conducting terminal of a switchgear apparatus.

In the medium voltage field, it is known the use of a tulip-contact-assembly for the electrical connection of a movable conducting terminal, provided on a draw-out circuit breaker, to a stationary conducting terminal of switchgear.

A first type of tulip-contact-assembly is known which comprises a support-frame which is defined by a pair of star-shaped flanges which are mutually parallel and spaced apart and which are fixed to one other by rod elements. The tulip-contact-assembly comprises a plurality of contact-fingers which rest into seat-portions obtained on the star-shaped flanges and are urged against the latter by helicoidal springs extending with a ring-shape around a central axis of the support-frame.

Each contact-finger has an oblong shape extending along a longitudinal axis parallel to the above mentioned central axis, and comprises a front contact-portion for removably engaging with a stationary contact-pin of switchgear, and a rear-contact-portion intended to keep in contact with a conducting-arm of the movable circuit breaker.

Both the front contact-portion and the rear-contact portion have rectangular cross-sections and plane-contact-surfaces for tangentially contacting with the curved surface of the stationary contact-pin and of the conducting-arm respectively. In other words, each front contact-portion contacts with the stationary contact-pin only in a single localised zone, and analogously each rear-contact portion contacts with the conducting-arm in a respective single localised zone.

This means that between each contact-finger and the stationary contact-pin a "single point" electrical connection occurs, and analogously the same occurs between each contact-finger and the conducting-arm as well.

A second known type of tulip-contact-assembly comprises a greater number of contact-fingers, compared with the first type of tulip-contact-assembly, with the contact-fingers being distributed around the central axis in pairs. The second type contact-fingers have a smaller thickness with respect to the first type contact-fingers.

Each pair of contact-fingers is angularly spaced apart from a further pair and comprises two contact-fingers placed side by side in mutually contact. In this type of tulip-contact-assembly, analogously to the contact-finger of the above-mentioned first type, each contact-finger has a rectangular cross-section with plane-contact surfaces for contacting in a single zone with the curved surface of the stationary contact-pin and of the conducting-arm. The second type of tulip-contact-assembly provides a number of electrical-contact zones which is greater than in the first type of tulip-contact-assembly, thus improving the electrical transmission capability in the contact position.

Nevertheless, the high number of contact-fingers makes such a tulip-contact-assembly rather structurally complicated, due to the high number of distinct interconnected components.

Furthermore, the high number of contact-fingers implies larger surfaces to be treated, in particular to be silvered for complying with conductivity-requirements, and this means a cost increase in the manufacturing which makes the second type of tulip-contact-assembly rather expensive.

Furthermore, in the above mentioned tulip-contact-assembly, rear ends of the finger-contacts engage with an annular groove obtained on the external cylindrical surface of the movable conducting-arm in order to fix to the latter the tulip-contact-assembly. This mounting configuration implies a rather steady position of the tulip-contact-assembly relative to the conducting-arm, i.e. a very limited possibility of relative movement for adapting to possible misalignment to the stationary contact-pin. Furthermore, the necessity of providing the external annular groove on the movable conducting terminal implies an additional manufacturing operation and thus an associated cost. In addition, the presence of the groove means a reduction of the cross-section area of the movable conducting terminal for the passage of electrical current, which results in a general reduction of the electrical conductivity capability of the system.

It would be desirable to improve the electrical connection devices, in particular by providing a technical solution which makes possible to obtain a reliable connection with increased conductivity performances, which provides a high position-flexibility in the coupling-position with the stationary contact-pin/conducting-arm and which, at the same time, is structurally simple and cheap to obtain.

This is achieved by a contact-finger-element and a tulip-contact assembly as defined in the appended claims and described herein.

According to the disclosure, there is provided a contact-finger-element comprising a first contact-portion and a second-contact-portion which are suitable for engaging with a first conducting terminal and with a second conducting-terminal respectively, wherein said first-contact-portion and said second-contact-portion have respective cross-sections including concave "V"-shaped profiles, each concave "V"-shaped profile comprising two straight portions mutually tilted by a respective included angle which is adapted so as to enable said first contact-portion and said second-contact-portion to tangentially contact with a curved surface of said first conducting terminal and second conducting terminal respectively at intermediate zones of the respective straight portions.

The present disclosure encompasses also a tulip-contact-assembly comprising a plurality of contact-finger-elements, as defined in the related appended claims and described herein, a switching device, in particular a circuit breaker, comprising one or more of such tulip-contact-assemblies and a switchgear, equivalently called with the term panel or cabinet or switchboard, comprising such a switching device.

Characteristics and advantages of the present disclosure will result from the description and from claims.

The present disclosure can be better understood and implemented with reference to the attached drawings that illustrate an embodiment thereof by way of a non-limiting example, in which:

FIG. 3 is an exploded view of the tulip-contact-assembly together with a conducting terminal;

FIG. 4 is a perspective view of a contact-finger-element according to the disclosure;

FIG. 5 is a side view of the contact-finger-element in FIG. 4;

FIG. 6 is a cross-section view taken along the plane VI-VI in FIG. 5;

FIG. 7 is an enlarged detail of FIG. 6;

FIG. 8 is a cross-section view taken along the plane VIII-VIII in FIG. 5;

FIG. 9 is an enlarged detail of FIG. 8;

Figure 2:
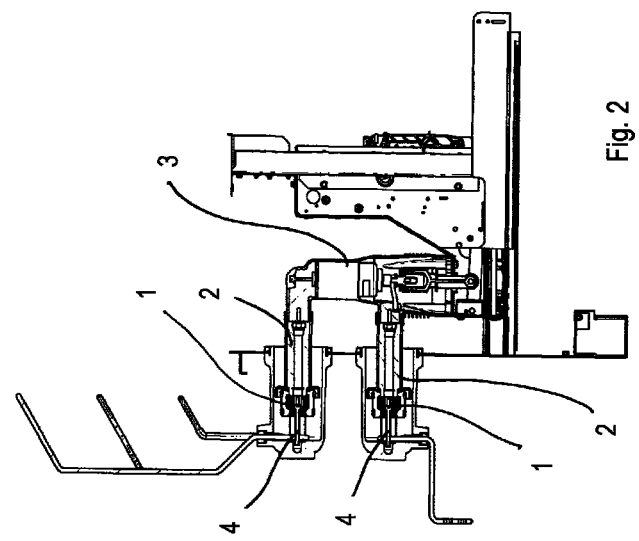
FIG. 2 is a side view of a circuit-breaker provided with tulip-contact assemblies according to the disclosure and arranged in an insertion operative configuration within a switchgear.
Figure 1:
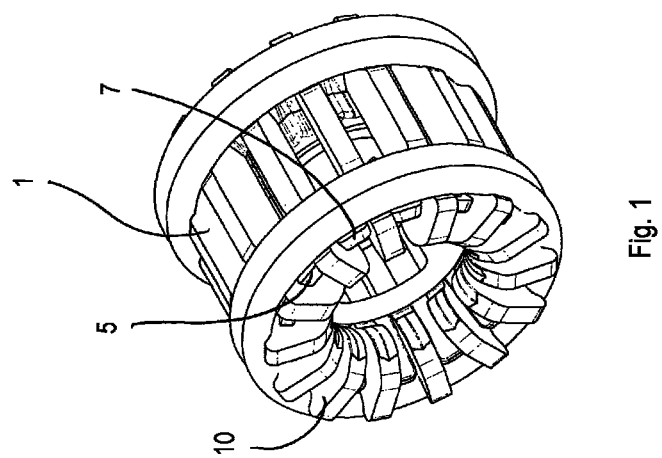
FIG. 1 is a perspective view of a tulip-contact assembly having contact-finger-elements according to the present disclosure.

FIG. 10 schematically shows part of a plurality of tulip-contact assemblies distributed around a conducting terminal;

FIG. 11 is an enlarged detail of FIG. 10 showing two zones of contact between a finger-contact-element and the conducting terminal;

FIG. 12 is a longitudinal section of the tulip-contact assembly of the invention assembled on a conducting terminal;

FIGS. 13 and 14 are a perspective view and a cross-section view respectively of a fingers-support-body of the tulip-contact assembly.

With reference to the attached Figures, a tulip-contact-assembly 1 including a plurality of contact-finger-elements 10 is shown, which is particularly suitable to be used in the Medium Voltage field, where, for the purposes of the present application, the term medium voltage refers to applications in the range from 1 kV up to some tens of kV, e.g. 52 kV. The tulip-contact-assembly 1 is suitable for being fixed to a conducting terminal 2 of a switching device, such as a circuit breaker 3, in particular a draw-out circuit breaker 3 housed in a switchgear apparatus. Such a circuit breaker 3, in a non-limitative way, is of the type which is supported by a trolley that can move from an extraction position with respect to a switchgear, in which a movable conducting terminal 2 (such as a contact-arm or a conducting-bushing), is disengaged from a stationary conducting terminal 4 (such as a stationary-conducting-pin), to an insertion position in the switchgear, in which the movable conducting terminal 2 is connected to the respective stationary conducting terminal 4. In the following exemplary and not limitative description, reference is made to a tulip-contact-assembly 1 which is fixed to a conducting terminal 2 mounted on and movable together with the circuit breaker 3 and having, in particular but in a non-limitative way, a cylindrical shape, and which engages with a stationary conducting terminal 4 of the switchgear also having a cylindrical shape. However, in an alternative further possible application, the tulip-contact-assembly 1 can also be assembled on a stationary conducting terminal of the switchgear in order to receive, and engage with, a movable conducting terminal.

The tulip-contact-assembly 1 comprises a fingers-support-body 5 for supporting and holding in a correct position a plurality of contact-finger-elements 10 which will be described in detail later on. The fingers-support-body 5 comprises a circular cage-body 9 on which the contact-finger-elements 10 rest according to a uniform angular distribution around a central axis 6.

Guiding-housing-protrusions 7 project from the circular cage-body 5 according to a circumferential distribution so as to define a plurality of seat-slots 8 each for a respective contact-finger-element 10. Each guiding-housing-protrusion 7 extends along a direction having radial and parallel components with respect to the central axis 6 allowing contact elements 10 to remain substantially vertical in radial direction.

Differently from the prior art tulip-contacts, in which rear ends of the finger-contacts engage with an annular groove obtained on the external cylindrical surface of the movable conducting terminal 2, the tulip-contact-assembly 1 of the invention can be coupled to the movable conducting terminal 2 with a certain degree of rotational freedom. This is obtained owing to the configuration of the fingers-support-body 5 which comprises an annular joint-rib 11. The annular joint-rib 11 protrudes internally from the circular cage-body 9 and has a circular cross section which makes possible an adjustable mechanical coupling of the fingers-support-body 5 with the movable conducting terminal 2. This annular joint-rib 11 is adapted to be received in an annular seat 12 which results from a coupling of a fastening-nut-element 13 with a front-end 14 of the movable conducting terminal 2. Such a configuration enables a rotation-adjustment of the fingers-support-body 5 relative to the movable conducting terminal 2 and thus ensures an alignment of the tulip-contact-assembly 1 with respect to the stationary conducting-terminal 4 in an electrical-coupling position.

Owing to such a configuration, there is no need for providing the movable conducting terminal with an external annular groove typical of the known devices. This means a save in the manufacturing process of the movable conducting terminal and furthermore ensures a better electrical conductivity performance due to the fact that the cross-section area of the movable conducting terminal for the passage of electrical current is not reduced by the presence of a groove as in the prior art configurations.

The fingers-support-body 5, in the exemplary non limitative version here described, is obtained as a single-piece. In particular, the fingers-support-body 5 is obtained by pressure die casting process and is made for instance from an aluminium material. Owing to the single-piece-configuration, an enhanced dimensional and geometrical stability of the fingers-support-body 5 is obtained which implies a more precise, firm and reliable positioning of the contact-finger elements 10 relative to the stationary conducting terminal 4 and movable conducting terminal 2 during operation in the electrical connected position.

The tulip-contact-assembly 1 further comprises spring elements 30 for urging the finger-contact-elements 10 in a contact position against the stationary conducting-terminal 4 and against the movable conducting-terminal 2.

On each contact finger element 10 there are obtained seats 28 for receiving the action of the spring elements 30, and a resting seat 29 through which the contact finger element 10 is received on the fingers-support body 5.

In the following, the contact-finger-element 10 is described in detail, which is better shown in FIGS. 4 to 10.

The contact-finger-element 10 comprises a body extending along a longitudinal axis 35, at opposite ends of which there are provided a first contact-portion 15, which is configured for engaging with an external cylindrical surface 16 of the stationary conducting terminal 4, and a second-contact-portion 17 which is configured for engaging with a respective external cylindrical surface 18 of the movable conducting terminal 2.

The first contact-portion 15 and the second-contact-portion 17 have respective cross-sections including concave "V"-shaped profiles. The "V"-shaped profile of the first contact-portion 15 and the respective "V"-shaped profile of the second-contact-portion 17 may be different from one other, each being adapted for properly interacting with the respective cylindrical surface of the stationary/movable conducting terminal.

The concave "V"-shaped profile of the first contact-portion 15 comprises two straight portions 19 mutually tilted by an included angle 20 as it can be seen in FIG. 11, and in FIG. 7 which is a detail of a cross-section view of the first contact-portion 15 taken along a plane orthogonal to the longitudinal axis 35 of the contact-finger-element 10.

The included angle 20 is adapted so as to enable the first contact-portion 15 to tangentially contact with the external cylindrical surface 16 of the stationary conducting terminal 4 at intermediate zones of the straight portions 19, as visible in FIG. 11. In particular, the intermediate zones are central zones of the straight portions 19 and the first included angle 20 is an obtuse angle.

In FIG. 11, contact zones 27 are visible between the intermediate zones of the straight portions 19 and the stationary conducting terminal 4. At the two contact zones 27 a "double-point-contact" is established for the passage of electrical current.

Owing to such a configuration of the "V"-shaped profile, the force exerted by the spring elements 30 on the contact-finger-element 10 acts radially and is concentrated on the contact zones 27 thus leading to a reduction in electrical resistance across the contact.

Analogously, the concave "V"-shaped profile of the second-contact-portion 17 comprises two respective straight portions 21 mutually tilted by a respective included angle 22 as it can be seen in FIG. 9 which is a detail of a cross-section view of the first contact-portion 15 taken along a plane orthogonal to the longitudinal axis 35 of the contact-finger-element 10. The respective included angle 22 is adapted so as to enable the second contact-portion 17 to tangentially contact with the further external cylindrical surface 18 of the movable conducting terminal 2 at respective intermediate zones of the straight portions 21. In particular, these intermediate zones are central zones of the straight portions 21, and the respective included angle 22 is an obtuse angle. As better shown in FIG. 4, the first contact-portion 15 is configured with a first "V"-shaped groove 23 delimited by two mutually incident first contact-surfaces 24 configured for tangentially contacting with the external cylindrical surface 16 of the stationary conducting terminal 4. In the shown exemplary and non-limitative embodiment, each first contact-surface 24 comprises a first conical-contact surface extending around an axis transversally arranged to the longitudinal axis 35 of the contact-finger-element 10. The two first contact-surfaces 24 are convex and symmetrically arranged with respect to a longitudinal middle plane 36 (shown in FIG. 6) of the contact-finger-element 10.

The second contact-portion 17 is configured with second "V"-shaped groove 25 delimited by two mutually incident second contact-surfaces 26 configured for tangentially contacting with the respective external cylindrical surface 18 of the movable conducting-terminal 2. In the shown exemplary and non-limitative embodiment, each second contact-surface 26 comprises a second conical-contact surface extending around a respective axis transversally arranged to the longitudinal axis 35 of the contact-finger-element 10. The two second contact-surfaces 26 are convex and symmetrically arranged with respect to the above-mentioned longitudinal middle plane 36 of the contact-finger-element 10.

Analogously to the first contact portion 15, also for the second-contact portion 17, contact zones result defined between the intermediate zones of the straight portions 21 and the movable conducting terminal 2. The force exerted by the spring elements 30 on each contact-finger-element 10 acts radially and is concentrated on such contact zones thus reducing the electrical resistance across the contact.

Owing to the V-shaped profiles of the first contact-portion 15 and of the second contact portion 17, a self-centering and alignment of the middle longitudinal plane 36 of the contact-finger element 10 with a radial plane of the stationary conducting terminal 2 and with a respective radial plane of the movable conducting terminal 4 is ensured, which constantly ensures a "double-point-contact", even during application of short circuit forces. Owing to the "double-point-contact", short circuit currents get divided in two parts and are distributed on large areas of the conducting terminal, thus minimizing the rise and concentration of heat due to the current. The presence of straight portions of the "V"-shaped profile means the presence of more conducting-material (of the contact-finger-element 10) near and around the contact zones and this contributes to generally reduce the electrical resistance, to prevent overheating conditions, and to improve the conductivity performance.

A mutual joining zone between the two first contact surfaces 24 is filleted with a proper radius for promoting the division of electrical current in two parts. A filleted mutual joining zone is analogously provided between the two second contact surfaces 26.

The first contact-surfaces 24 and the second contact-surfaces 26 are obtained by coining process, so as to increase their mechanical properties, in particular the hardness, and have respective external edges which are rounded off for preventing localised overheating.

The electrical conductivity capability is noticeably improved owing to the structural configuration above described, especially owing to the "V"-shaped profiles with straight portions which are so tilted as to tangentially contact, at intermediate zones thereof, with the conducting terminals.

It is evident, from the above description, that the tulip-contact assembly 1 provides the advantages of an electrical transmission through several contact points (two contact points for each contact-finger-element 10) but at the same time proves to be structurally simpler and cheaper to be obtained with respect to the known tulip-devices having pairs of contact-fingers placed side by side in mutually contact.

The tulip contact assembly 1, owing to the above described configuration of the contact-finger-elements 10, guarantees a precise and firm contact-position and a reduced contact electrical resistance thus improving the overall performance during passage of currents, in particular in case of short circuit conditions.

The tulip-contact assembly 1 is susceptible of modifications or variations all within the scope of the inventive concept as defined by the appended claims; any details may be replaced with technically equivalent elements.

One or more of the elements above described may be differently shaped and/or positioned, can be differently coupled or positioned, etcetera.

The materials, so long as they are compatible with the specific use, as well as the individual components, may be any according to the requirements and the state of the art.

The invention claimed is:
1. Contact-finger-element comprising:
a first contact-portion and a second-contact-portion which are configured for engaging with a first conducting terminal and with a second conducting-terminal respectively, wherein said first-contact-portion and said second-contact-portion have respective cross-sections including concave "V"-shaped profiles, each concave "V"-shaped profile being composed of two straight portions mutually tilted by a respective included angle which is selected to enable said first contact-portion and said second-contact-portion to tangentially contact with a curved surface of said first conducting terminal and of said second conducting terminal respectively at intermediate zones of the respective straight portions;

wherein said first contact-portion is obtained at a first end of a body extending along a longitudinal axis and has a first "V"-shaped groove delimited by two mutually incident first contact-surfaces configured for tangentially contacting with the curved surface of said first conducting terminal, and wherein said second contact-portion is obtained at a second end of said body and has a second "V"-shaped groove delimited by two mutually incident second contact-surfaces configured for tangentially contacting with the curved surface of said second conducting-terminal; and wherein said first contact-surfaces comprise first conical-contact-surfaces which are convex and symmetrically arranged with respect to a longitudinal plane of said body, and wherein said second contact-surfaces comprise second conical-contact-surfaces which are convex and symmetrically arranged with respect to said longitudinal plane.

2. Contact-finger-element according to claim 1 wherein the included angle between each pair of straight portions is selected to enable said first contact-portion and said second-contact-portion to tangentially contact with the respective curved surface at central zones of the respective straight portions.

3. Contact-finger-element according to claim 1, wherein a cross-section of said first contact-portion taken along a plane orthogonally arranged with respect to said longitudinal axis has a "V"-shaped profile whose straight portions are mutually tilted by a first obtuse angle, and wherein a further cross-section of said second contact-portion taken along a respective plane orthogonally arranged with respect to said longitudinal axis has a "V"-shaped profile whose straight portions are mutually tilted by a second obtuse angle.

4. Contact-finger-element according to claim 3, wherein said second obtuse angle is different from said first obtuse angle such that it is configured for a different external diameter of said second conducting terminal.

5. Contact-finger-element according to claim 1, wherein a mutual joining zone between the first contact-surfaces and a further mutual joining zone between the second contact-surfaces are filleted.

6. Contact-finger-element according to claim 1, wherein said first contact-surfaces and said second contact-surfaces have respective external edges which are rounded off by a coining.

7. A tulip-contact-assembly comprising:
a plurality of contact-finger-elements according to claim 1;
a fingers-support-body having a circular cage-body configured for receiving resting-seats of said contact-finger-elements, and guiding-housing-protrusions projecting from said circular cage-body according to a circumferential distribution so as to define a plurality of seat-slots each for a respective contact-finger-element;
spring elements for urging said finger-contact-elements in a contact position against said first conducting-terminal and against said second conducting-terminal, said spring elements being configured for engaging with groove-seats obtained on said contact-finger-elements.

8. The tulip-contact-assembly according to claim 7, wherein said fingers-support-body comprises:
an annular joint-rib through which is configured to be connectable to said second conducting-terminal, said annular joint-rib internally protruding from said circular cage-body and having a circular cross section configured for enabling a rotation-adjustment of said fingers-support-body relative to said second conducting-terminal for ensuring an alignment of said tulip-contact-assembly with said first conducting-terminal in an electrical-coupling position.

9. The tulip-contact-assembly according to claim 7, wherein said fingers-support-body is integrally configured as a single-piece.

10. The tulip-contact-assembly according to claim 9, wherein said single-piece is an aluminium pressure die casting.

11. The tulip-contact-assembly according to claim 7, including said second conducting terminal which comprises:
a conducting-bushing, wherein said conducting-bushing is externally delimited by a cylindrical surface against which said second-contact portions abut, and a locking nut for connecting said annular joint-rib to a front end of said conducting-bushing.

12. Switching device comprising one or more tulip-contact-assemblies according to claim 7.

13. Switchgear apparatus comprising a switching device according to claim 12, wherein said switching device comprises:
a circuit breaker.

14. A tulip-contact-assembly comprising:
a plurality of contact-finger-elements comprising a first contact-portion and a second-contact-portion which are configured for engaging with a first conducting terminal and with a second conducting-terminal respectively, wherein said first-contact-portion and said second-contact-portion have respective cross-sections including concave "V"-shaped profiles, each concave "V"-shaped profile being composed of two straight portions mutually tilted by a respective included angle which is selected to enable said first contact-portion and said second-contact-portion to tangentially contact with a curved surface of said first conducting terminal and of said second conducting terminal respectively at intermediate zones of the respective straight portions;
a fingers-support-body comprising a circular cage-body configured for receiving resting-seats of said contact-finger-elements, guiding-housing-protrusions projecting from said circular cage-body according to a circumferential distribution so as to define a plurality of seat-slots each for a respective contact-finger-element, and an annular joint-rib through which is configured to be connectable to said second conducting-terminal, said annular joint-rib internally protruding from said circular cage-body and having a circular cross section configured for enabling a rotation-adjustment of said fingers-support-body relative to said second conducting-terminal for ensuring an alignment of said tulip-contact-assembly with said first conducting-terminal in an electrical-coupling position; and
spring elements for urging said finger-contact-elements in a contact position against said first conducting-terminal and against said second conducting-terminal, said spring elements being configured for engaging with groove-seats obtained on said contact-finger-elements.

15. The tulip-contact-assembly according to claim 14, wherein said fingers-support-body is integrally configured as a single-piece.

16. The tulip-contact-assembly according to claim 15, wherein said single-piece is an aluminium pressure die casting, and including said second conducting terminal which comprises a conducting-bushing, wherein said conducting-bushing is externally delimited by a cylindrical surface against which said second-contact portions abut, and a locking nut for connecting said annular joint-rib to a front end of said conducting-bushing.

17. Switchgear apparatus comprising:
a switching device comprising one or more tulip-contact-assemblies according to claim 16;
wherein said switching device comprises a circuit breaker.

18. The tulip-contact-assembly according to claim 14, wherein a cross-section of said first contact-portion taken along a plane orthogonally arranged with respect to said longitudinal axis has a "V"-shaped profile whose straight portions are mutually tilted by a first obtuse angle, and wherein a further cross-section of said second contact-portion taken along a respective plane orthogonally arranged with respect to said longitudinal axis has a "V"-shaped profile whose straight portions are mutually tilted by a second obtuse angle, and said second obtuse angle is different from said first obtuse angle such that it is configured for a different external diameter of said second conducting terminal.

19. Contact-finger-element according to claim 2, wherein a cross-section of said first contact-portion taken along a plane orthogonally arranged with respect to said longitudinal axis has a "V"-shaped profile whose straight portions are mutually tilted by a first obtuse angle, and wherein a further cross-section of said second contact-portion taken along a respective plane orthogonally arranged with respect to said longitudinal axis has a "V"-shaped profile whose straight portions are mutually tilted by a second obtuse angle, and said second obtuse angle is different from said first obtuse angle such that it is configured for a different external diameter of said second conducting terminal.

20. Contact-finger-element according to claim 19, wherein a mutual joining zone between the first contact-surfaces and a further mutual joining zone between the second contact-surfaces are filleted, and said first contact-surfaces and said second contact-surfaces have respective external edges which are rounded off by a coining.

* * * * *